US009005011B2

(12) United States Patent
Gagner et al.

(10) Patent No.: US 9,005,011 B2
(45) Date of Patent: Apr. 14, 2015

(54) PRESENTING WAGERING GAME CONTENT

(75) Inventors: Mark B. Gagner, West Chicago, IL (US); Damon E. Gura, Chicago, IL (US); Craig J. Sylla, Round Lake, IL (US)

(73) Assignee: WMS Gaming, Inc., Waukegan, IL (US)

( * ) Notice: Subject to any disclaimer, the term of this patent is extended or adjusted under 35 U.S.C. 154(b) by 413 days.

(21) Appl. No.: 12/681,985

(22) PCT Filed: Oct. 15, 2008

(86) PCT No.: PCT/US2008/080051
§ 371 (c)(1),
(2), (4) Date: Apr. 7, 2010

(87) PCT Pub. No.: WO2009/052219
PCT Pub. Date: Apr. 23, 2009

(65) Prior Publication Data

US 2010/0210353 A1 Aug. 19, 2010

Related U.S. Application Data

(60) Provisional application No. 60/980,904, filed on Oct. 18, 2007, provisional application No. 60/980,671, filed on Oct. 17, 2007.

(51) Int. Cl.
*A63F 9/24* (2006.01)
*A63F 13/00* (2014.01)
(Continued)

(52) U.S. Cl.
CPC .............. *G07F 17/323* (2013.01); *G07F 17/32* (2013.01); *G07F 17/3209* (2013.01); *G07F 17/3262* (2013.01)

(58) Field of Classification Search
CPC ............ G07F 17/3211; G07F 17/3244; G07F 17/3267
USPC .......................................... 463/16, 20, 25, 42
See application file for complete search history.

(56) References Cited

U.S. PATENT DOCUMENTS 5,129,652 A 7/1992 Wilkinson et al.
5,890,962 A 4/1999 Takemoto
(Continued)

FOREIGN PATENT DOCUMENTS

WO WO-2007006002 1/2007

OTHER PUBLICATIONS

"PCT Application No. PCT/US08/80051 International Preliminary Report on Patentability", Nov. 19, 2009 , 9 pages.
(Continued)

*Primary Examiner* — James S McClellan
*Assistant Examiner* — Wei Lee
(74) *Attorney, Agent, or Firm* — DeLizio Gilliam, PLLC

(57) ABSTRACT

Techniques for processing and presenting wagering data are presented herein. In one embodiment, a method comprises configuring a wagering game terminal for contemporaneously presenting content for a plurality of wagering games. Configuring the terminal can include dividing a player interface into a plurality of areas, wherein each of the areas is associated with one of the plurality of wagering games. The configuring can also include resizing the content to fit in the areas. The method can also include receiving, from a remote wagering game server, results for one or more of the wagering games, and selecting portions of the content, wherein the portions of the content graphically represent the results. The method can also include displaying the portions of the content.

20 Claims, 9 Drawing Sheets

(51) Int. Cl.
*G06F 17/00* (2006.01)
*G06F 19/00* (2011.01)
*G07F 17/32* (2006.01)

(56) References Cited

U.S. PATENT DOCUMENTS

| | | | | |
|---|---|---|---|---|
| 6,311,976 | B1 | 11/2001 | Yoseloff et al. | |
| 6,443,837 | B1 * | 9/2002 | Jaffe et al. | 463/16 |
| 6,592,460 | B2 | 7/2003 | Torango | |
| 6,790,142 | B2 | 9/2004 | Okada et al. | |
| 6,860,810 | B2 * | 3/2005 | Cannon et al. | 463/20 |
| 7,160,187 | B2 | 1/2007 | Loose et al. | |
| 7,472,910 | B1 * | 1/2009 | Okada et al. | 463/43 |
| 2002/0183105 | A1 * | 12/2002 | Cannon et al. | 463/16 |
| 2003/0153377 | A1 * | 8/2003 | Lisowski, Sr. | 463/13 |
| 2005/0020358 | A1 | 1/2005 | Cram | |
| 2005/0054441 | A1 * | 3/2005 | Landrum et al. | 463/35 |
| 2005/0148383 | A1 * | 7/2005 | Mayeroff | 463/20 |
| 2006/0073887 | A1 | 4/2006 | Nguyen et al. | |
| 2006/0073888 | A1 | 4/2006 | Nguyen et al. | |
| 2006/0111172 | A1 | 5/2006 | Walker et al. | |
| 2006/0252530 | A1 * | 11/2006 | Oberberger et al. | 463/29 |
| 2006/0287074 | A1 | 12/2006 | Walker et al. | |
| 2006/0287111 | A1 * | 12/2006 | Mitchell et al. | 463/46 |
| 2007/0111787 | A1 | 5/2007 | Adams et al. | |
| 2008/0132331 | A1 * | 6/2008 | Gatto et al. | 463/31 |
| 2008/0188285 | A1 | 8/2008 | Roelofs | |
| 2009/0280891 | A1 | 11/2009 | Filipour et al. | |
| 2009/0286585 | A1 | 11/2009 | Walker | |
| 2010/0009743 | A1 | 1/2010 | Amaitis et al. | |
| 2010/0210345 | A1 | 8/2010 | Berman et al. | |
| 2010/0304848 | A1 | 12/2010 | Detlefsen et al. | |
| 2011/0009188 | A1 | 1/2011 | Adiraju et al. | |
| 2011/0028203 | A1 | 2/2011 | Agarwal et al. | |
| 2011/0053672 | A1 | 3/2011 | Gagner et al. | |
| 2011/0263318 | A1 | 10/2011 | Agarwal et al. | |

OTHER PUBLICATIONS

"PCT Application No. PCT/US08/80051 International Search Report", Dec. 12, 2008 , 10 pages.
"U.S. Appl. No. 13/204,203 Office Action", Jun. 21, 2012 , 22 pages.
"U.S. Appl. No. 13/204,203 Final Office Action", Oct. 5, 2012 , 18 pages.
"U.S. Appl. No. 13/204,203 Office Action", Jul. 5, 2013 , 16 pages.

* cited by examiner

PRESENTING WAGERING GAME CONTENT

RELATED APPLICATIONS

This application claims the priority benefit of U.S. Provisional Application Ser. No. 60/980,671 filed Oct. 17, 2007 and U.S. Provisional Application Ser. No. 60/980,904 filed Oct. 18, 2007.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

FIELD

Embodiments of the inventive subject matter relate generally to wagering game systems, and more particularly to presenting wagering game content in wagering game systems.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Some wagering game systems attempt to enhance the gaming experience by offering primary wagering games that trigger secondary games. For example, when certain reel combinations occur (e.g., all cherries) in primary slots games, the system triggers secondary games (a.k.a. bonus games). The secondary game outcomes are often determined by random selection and displayed using spinning wheels or other indicia that reveal cash awards and other results. Typically, systems present primary games on one display device and secondary games on another display device.

SUMMARY

In some embodiments, a method comprises configuring a wagering game terminal for contemporaneously presenting content for a plurality of wagering games, the configuring includes, dividing a player interface into a plurality of areas, wherein each of the areas is associated with one of the plurality of wagering games; and resizing the content to fit in the areas; receiving, from a remote wagering game server, results for one or more of the wagering games; selecting portions of the content, wherein the portions of the content graphically represent the results; and displaying the portions of the content.

In some embodiments, the method further comprises receiving another result for another of the plurality of wagering games; selecting another portion of the content, wherein the other portion graphically represents the other result; and displaying the other portion of the content superimposed over one or more of the portions of content.

In some embodiments, the method further comprises receiving a request to present non-gaming content in the player interface, wherein the non-gaming content is stored on the wagering game terminal; and presenting the non-gaming content in the player interface.

In some embodiments, the non-gaming content includes one or more selected from advertising content, player messaging content, hospitality content, and attract mode content.

In some embodiments, the method further comprises subdividing the player interface to include another area; resizing the non-gaming content to fit in the other area, wherein the presenting displays the non-gaming content in the other area.

In some embodiments, the content resides on the wagering game terminal before the results are received.

In some embodiments, the areas are different sizes.

In some embodiments, a wagering game terminal comprises a content store including wagering game content for presenting results for a plurality of wagering games; and a presentation controller including, a control unit configured to process control information including the results for the plurality of wagering games; a graphics unit configured to resize game elements included in the wagering game content, and to display the game elements in separate areas of a player interface, wherein each of the separate areas corresponds with a different one of the plurality of wagering games, and wherein the game elements graphically represent the results; and an audio unit configured to process and present, via the audio presentation device, sounds included in the wagering game content.

In some embodiments, the content store also includes non-gaming content, and wherein the control information further includes a request to present the non-gaming content, and wherein the graphics unit is further configured to present the non-gaming content in the player interface.

In some embodiments, the non-gaming content includes advertising content, player messaging content, hospitality content, and attract mode content.

In some embodiments, the content store also includes non-gaming content, and wherein the control information further includes a request to present the non-gaming content, and wherein the graphics unit is further configured to superimpose the non-gaming content over one or more of the game elements.

In some embodiments, the game elements include one or more selected from slot reel symbols, playing cards, and keno game pieces.

In some embodiments, the wagering game terminal further comprises an input device configured to receive player input, wherein the wagering game terminal is configured to forward the player input to a wagering game server; a video display device configured to display the player interface; and an audio presentation device configured to present sound associated with the results.

In some embodiments, the graphics unit is further configured to superimpose other game elements associated with one of the plurality of wagering games over the game elements in one or more of the separate areas.

In some embodiments, a tangible machine-readable medium including code can be executable by a wagering game terminal.

In some embodiments, the code comprises code to detect initiation of a first number of wagering games; code to divide a player interface into the first number of areas; code to shrink game elements to fit in the first number of areas, wherein the game elements indicate results for the first number of wagering games; code to receive, from a remote wagering game network device, the results for certain of the first number of wagering games; code to select certain of the game elements based on the results; code to display the selected game elements; code to end one of the first number of wagering games; code to divide the player interface into a second number of game areas; and code to enlarge remaining ones of the game elements to fit in the second number of game areas.

In some embodiments, the game elements include playing cards and slots reels.

In some embodiments, the tangible machine-readable medium further comprises code to superimpose a message about one of the wagering games over one or more of the selected game elements.

In some embodiments, the second number of areas is lesser than the first number of areas.

In some embodiments, the wagering games include primary wagering games and secondary wagering games, and wherein the secondary wagering games do not depend on results of the primary wagering games.

In some embodiments, the tangible machine-readable medium further comprises code to receive a request to present non-gaming content, wherein the non-gaming content is stored on the wagering game terminal; and code to superimpose non-gaming content over one or more of the game elements.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into five sections. The first section provides an introduction to embodiments of the invention, while the second section describes an example operating environment. The third section describes additional embodiments and the fourth section presents some general comments.

Introduction

As noted above, wagering game players often desire a variety of wagering game content. Some embodiments of the invention provide more wagering game content by enabling players to play multiple games simultaneously. For example, some embodiments enable players to play poker, keno, and black jack, all on a single display screen. As a player chooses to play more games, the system can reduce the screen area allocated to each game. To fit the games in smaller areas, the system can reduce the size of each game's elements (e.g., cards, reels, etc).

Other embodiments provide more content by enabling players to play secondary games that are independent of any primary game. For example, players can participate in secondary games without first achieving specific results in primary games (e.g., players can buy into secondary games). In some embodiments, the system can overlay content for the independent secondary games over content associated with primary games. For example, the system may overlay a prize notification for a secondary game over the spinning reels of a primary slots game. The simultaneous presentation of different content can make the gaming experience more exciting.

To provide the features noted above (e.g., independent secondary games), some embodiments of the system can launch and terminate primary and secondary wagering games, and communicate wagering information between the primary and secondary wagering games. This separation between primary and secondary games enables wagering game designers to more rapidly develop new secondary games and to develop secondary games independently of primary games.

These and other features are described in greater detail in the following section.

Operating Environment

This section describes example operating environments and presents structural aspects of some embodiments. This section also describes operations and communications associated with some embodiments of the invention. In certain embodiments, the operations can be performed by executing instructions residing on machine-readable media (e.g., software), while in other embodiments, the operations can be performed by a combination of software, hardware, and/or other logic (e.g., firmware). In some embodiments, the operations can be performed in series, while in other embodiments, one or more of the operations can be performed in parallel. Moreover, some embodiments can perform less than all the operations shown in the Figures.

Example Architecture

Figure 1:
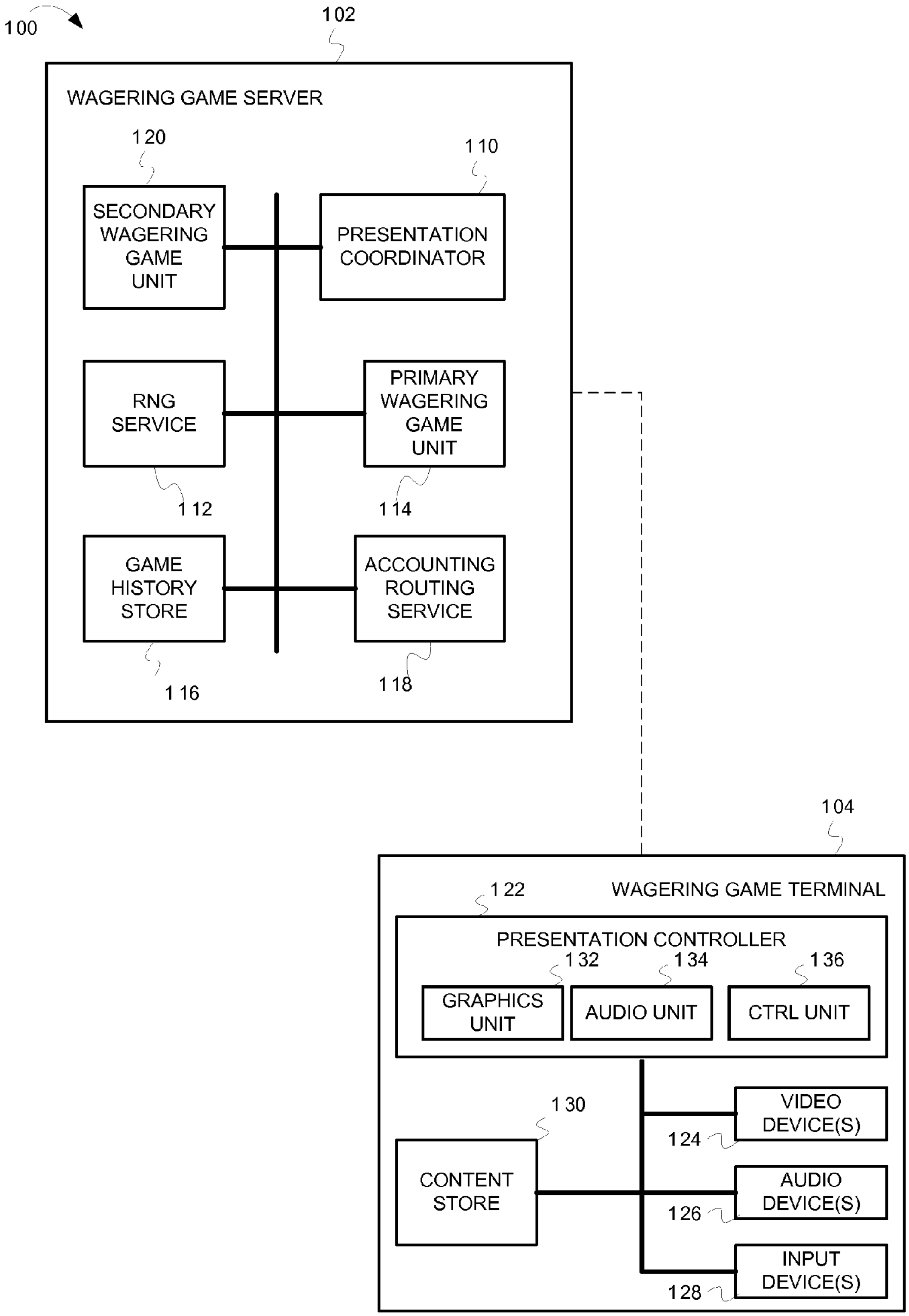
FIG. 1 is a block diagram illustrating a system for presenting wagering games, according to some embodiments of the invention.

FIG. 1 is a block diagram illustrating a system for presenting wagering games, according to some embodiments of the invention. In FIG. 1, the system 100 includes a wagering game server ("server") 102 and wagering game terminal ("terminal") 104. In some embodiments, the server 102 controls wagering games, while the terminal 104 presents game results and other content. Although FIG. 1 shows only one terminal 104, the server 102 can interact with a plurality of terminals (e.g., banks of stationary wagering game terminals and numerous mobile terminals in one or more casinos).

The server 102 includes a presentation coordinator 110, random number generator service 112, game history store 116, and accounting routing service 118. The presentation coordinator 110 can configure, launch, and terminate primary wagering game units and secondary wagering game units. The presentation coordinator 110 can also maintain a list of all terminals with which it interacts.

The primary wagering game unit 114 can offer a plurality of primary wagering game types (e.g., slots, poker, roulette, etc.) and themes (e.g., a movie theme, cartoon theme, etc.). The secondary wagering game unit 120 can offer a plurality of secondary wagering games (a.k.a. bonus games). In some embodiments, secondary games are triggered by events in primary games. Alternatively, secondary games may be triggered by events independent of any primary game. For example, players can buy into a secondary game in which one randomly selected player wins a progressive jackpot irrespective of any primary game.

The presentation coordinator 110 can maintain a list of all active terminals. The primary and secondary wagering game units 114 & 120 can host wagering games and receive player input from the terminal 104. When hosting wagering games, the primary and secondary wagering game units 114 & 120 can use the random number generator service 112 to determine wagering game results. The primary and secondary wagering game units 114 & 120 can send control information to the terminal 104, where the control information indicates results for the wagering games. For example, the control information can instruct the terminal 104 to present a specific outcome for a wagering game (e.g., a certain reel combination for a slots game). In turn, the terminal 104 can present content indicting the results. In some embodiments, control information can instruct the terminal 104 to present other types of content, such as advertising, attract modes, player messages, hotel information, etc. The control information can be in any format understood by the terminal 104.

The server 102 also includes an accounting routing service 118, which can distribute wagering game information (e.g., wager amounts, winning awards, etc.) between primary and secondary wagering game units 114 & 120, an account server (not shown), and other components of the wagering game system 100.

The terminal 104 can act as a smart client device capable of transmitting player input to the server 102, processing control information, and rendering wagering game content. The terminal 104 includes a content store 130 and a presentation controller 122. The presentation controller 122 includes a control unit 136, graphics unit 132, and audio unit 134. The control unit 136 can process control information and request operations from the other components. In response to the control information, the graphics and audio units 132 & 134 can present content from the content store 130. For example, if the control information instructs the terminal 104 to present a specific game result, the graphics and audio units 132 & 134 present the game result using audio and graphic content in the content store 130. The control information can instruct the presentation controller 122 to present any type of information, such as game results, player messages, attract modes, advertising, hotel information, etc.

The presentation controller's graphics and audio units 132 & 134 can include audio codecs, video codecs, graphics processing engines, physics engines, and any other devices suitable for presenting audio and video content. The content store 130 can include animation data, game art (e.g., JPEG files, PCX files, etc.), audio content (e.g., MP3 files, WAV files, etc.), prerecorded video (e.g., MPEG files, AVI files, etc.), text, metadata (e.g., audio & video configuration data), etc.

The content store's content can be updated anytime. As a result, the system 100 can change a game's look and feel without changing the underlying game logic. For example, the terminal 104 can download new graphics that represent playing cards in a video poker game. The video poker game will look different because the playing card graphics are different. However, the new graphics will not affect how the game is played. Updating content in the content store 130 can also change the look and feel of advertising, player messages, etc.

The terminal 104 also includes video device(s) 124, audio device(s) 126, and input device(s) 128. The video device(s) 124 can include LCD devices, plasma display devices, and other suitable display devices. The audio device(s) 126 can include audio hardware (e.g., a sound card), audio speakers, and other audio presentation devices.

When the terminal 104 initializes, it can register with the server's presentation coordinator 110 to determine what types of primary and secondary wagering games it will offer.

Although not shown in FIG. 1, the terminal 104 can receive control information from other components, such as advertising servers, messaging servers, hotel information servers, etc. As a result, the terminal 104 can present content in response to control information from various sources.

In some embodiments, the terminal 104 can be included in wagering game machines or other devices, such as cell phones, notebook computers, etc.

Control Information

The control information can include initial game states, intermediate game results, final game results, and more. For example, control information can include any of the following:

- Initial Game States—Control information can indicate how a wagering game initially appears to a player. The initial game state can include an initial arrangement of game elements for card games, picking games, etc.
- Intermediate Game Results—Control information can indicate what game elements should be shown as games progress, but before they are final. Intermediate results can indicate values for game elements, such as cards, slots reels, game tokens, etc.
- Final Game Results—Control information can indicate how game elements should be arranged in games' final states, whereby the game elements indicate whether players won or lost wagers.
- Content Parameters—Control information can identify other content for presentation on the terminal 104. For example, the control information can specify content from the content store 130, such as animations, live video feeds, recorded video, graphics, etc. The control information can also specify locations in the player interface, timing, volume, and other parameters.
- Other Information—The control information can include instructions to initiate new games, which may cause terminals scale content and perform other operations (see discussion of FIG. 2). The control information can also include information for configuring terminal components.

Priority Information

Because terminals can present content for a plurality of wagering games, some embodiments assign a priority to content presentation requests. Terminals can use priority to resolve conflicts when they receive multiple content presentation requests from multiple system components (e.g., primary game units, secondary game units, advertising servers, etc.). Criteria for determining priority can include:

- Source Identifier—Priority can be based on the source of control information that includes a request to present content (e.g., a particular wagering game server or a particular primary wagering game unit).
- Presentation Request Type—Control information can request content presentations for primary games, secondary games, advertising, hospitality information, terminal maintenance, etc. The different request types can have different priorities.
- Timing—Priority can be based on the time at which content presentation requests are sent, received, or otherwise processed.
- Component State—Priority can be based on states associated with components that request content presentation. In some embodiments, primary and secondary wagering game units can be in states such as: initiation state (i.e., about to begin play), playing state, status update state (e.g., changing status of a credit meter), idle, etc. The following is an example of states and priority. The primary unit 114 and the secondary unit 120 can each conduct games for a specific terminal. When both the primary and secondary units are in an idle state, the secondary game may have higher priority. Higher priority can cause the secondary game's content to appear in a larger display area, to be superimposed over other content, etc. If one game moves to a playing state, its priority may be heighted. If both are playing, the secondary game may have higher priority. Similarly non-gaming request sources (e.g., an advertising server) can also have different states.

Terminals can use priority to determine: display areas for selected content, overlay ordering for different content occupying the same space, size, etc. Furthermore, the terminal (or other components) can store tables and other data for determining priority.

Presenting Multiple Games on a Single Terminal

Figure 3:
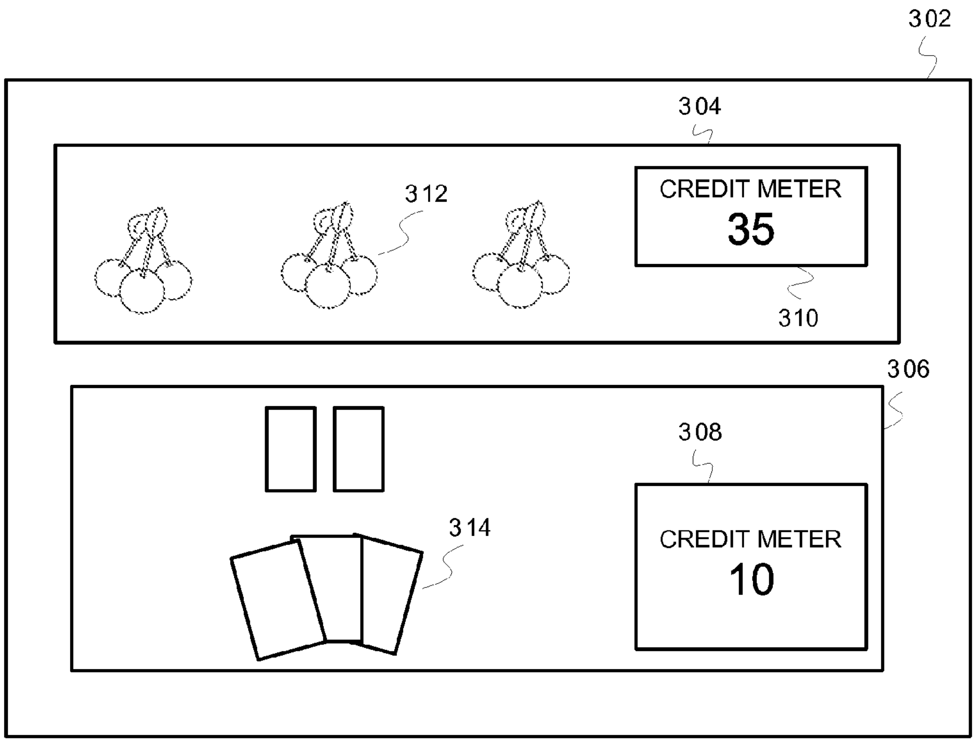
FIG. 3 shows a player interface in which the graphics unit 132 has allocated areas for two wagering games.
Figure 4:
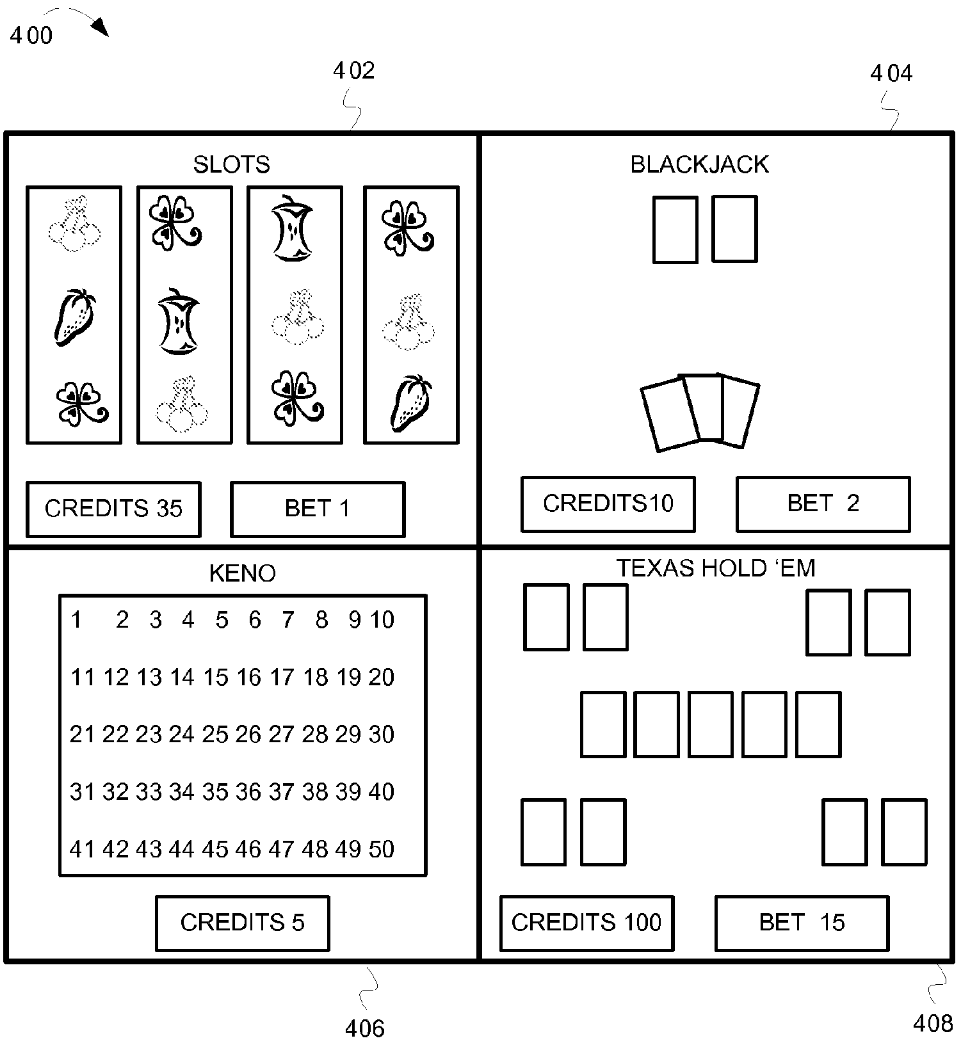
FIG. 4 shows a player interface that has allocated areas to four wagering games.

This section describes how a single terminal can present a plurality of wagering games. In this section, FIGS. 2 describes operations for presenting content for multiple games on a single terminal, while FIGS. 3 & 4 show multi-game player interfaces.

Figure 2:
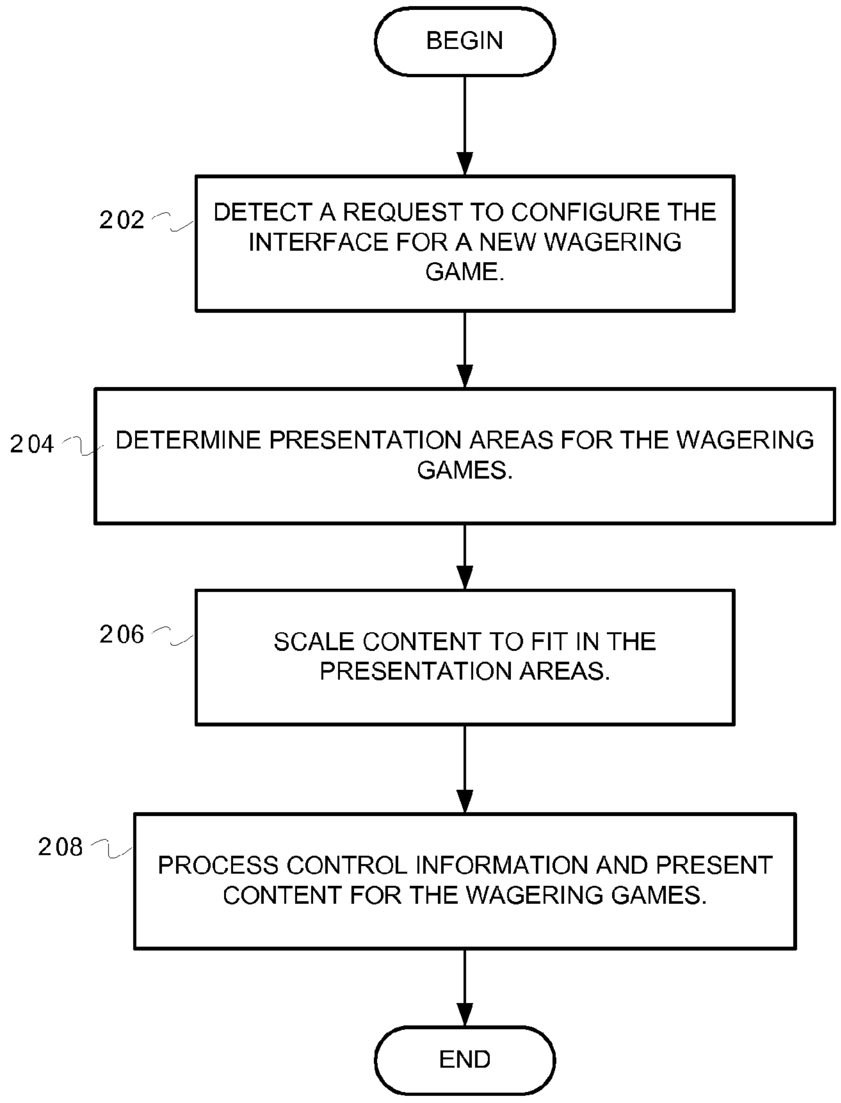
FIG. 2 is a flow diagram illustrating operations for presenting content for multiple wagering games on a single terminal, according to some embodiments of the invention.

FIG. 2 is a flow diagram illustrating operations for presenting content for multiple wagering games on a single terminal, according to some embodiments of the invention. The flow 200 will be described with respect to the embodiments shown in FIG. 1. The flow 200 begins at block 202.

At block 202, the presentation controller 122 detects a request to configure its player interface to accommodate content for another wagering game. In some embodiments, the terminal 104 notifies the server 102 that a player has selected another wagering game via the player interface. In turn, the terminal 104 receives control information requesting that it present another wagering game in the player interface. In some embodiments, the server 102 launches a new wagering game unit to host the newly selected game. The flow continues at block 204.

At block 204, the presentation controller's graphics unit 132 determines new presentation areas for the new wagering game and any other wagering games already in process. If there are no other wagering games in process, the graphics unit 132 can allocate the entire player interface to the newly selected game. Otherwise, the graphics unit 132 can divide the player interface between the newly selected game and the game(s) in process. FIGS. 3 & 4 illustrate this concept.

FIG. 3 shows a player interface in which the graphics unit 132 has allocated areas for two wagering games. In FIG. 3, the player interface 302 includes a first wagering game area 304 and a second wagering game area 306. The first area 304 includes content 312 indicating results for a first wagering game (e.g., a video slots game). The first area 304 also includes a credit meter 310 indicating a credit balance for use in playing wagering games in the first area 304. The second area 306 includes content representing results of a second wagering game (e.g., black jack) and a second credit meter 308. If the terminal is presenting content for one wagering game, after another game is selected, the terminal's graphics unit 132 can divide the player interface as shown in FIG. 3.

In some embodiments, terminals can show any number of wagering games. As the number of games increases, the area allocated to each game may decrease. FIG. 4 shows a player interface that has allocated areas to four wagering games. In FIG. 4, the player interface 400 is divided into four wagering game areas 402, 404, 406, & 408. As shown, each area includes content representing results for a different wagering game (e.g., slots, blackjack, keno, and Texas Hold'em). Priority can affect how the graphics unit 132 divides a player interface. Referring back to FIG. 2, the flow continues at block 206.

At block 206, the graphics unit 132 scales content to fit in the presentation areas. For example, if a player has initiated four games (see FIG. 4), the graphics unit 132 can resize each game's elements (e.g., cards, reels, etc.) to one-fourth their original size. In some embodiments, the graphics unit 132 scales all content associated with each wagering game before presenting any additional content. As a result, latencies for scaling content are incurred only once (i.e., just after a player has selected a new game). Alternatively, the graphics unit 132 can dynamically scale content as it is needed. The graphics unit 132 can scale game content (e.g., stored in the content store 130) in any suitable fashion, such as by compressing files (e.g., JPEG files, MPEG files, etc.), changing graphics parameters, downloading new files, etc. The flow continues at block 208.

At block 208, the presentation controller 122 processes control information associated with the wagering games and presents content for the wagering games. For example, the presentation controller 122 receives game results from the server 102 and presents those results using scaled content. In other embodiments, the graphics unit 132 dynamically scales content just before presenting it in the player interface. Operations for processing control information and presenting content are described in more detail below (see discussion of FIG. 5). From block 208, the flow ends.

Although not shown in FIG. 2, some embodiments of the terminal 102 can increase the scale of game elements when players cancel games. For example, in FIG. 4, if a player cancels one of the four games in the player interface 400 (e.g., the blackjack game in area 404), the terminal's graphics unit 132 can determine new presentation areas for the remaining three games. Additionally, the graphics unit can scale-up the content accordingly.

Figure 5:
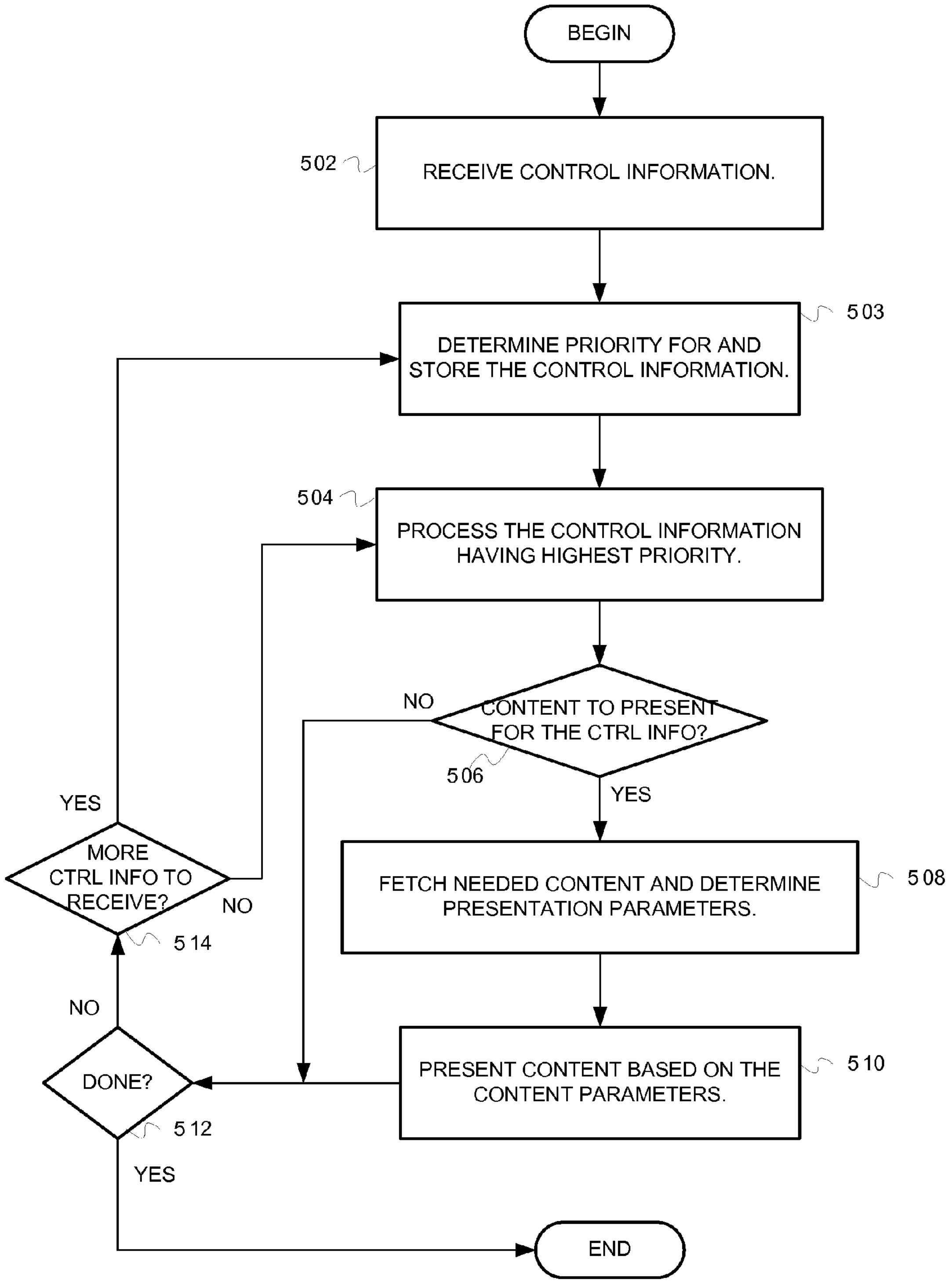
FIG. 5 is a flow diagram that illustrates operations for processing control information and presenting content in a player interface, according to some embodiments of the invention.

FIG. 5 is a flow diagram that illustrates operations for processing control information and presenting content in a player interface, according to some embodiments of the invention. The flow 500 will be described with respect to the embodiments shown in FIG. 1. The flow 500 begins at block 502.

At block 502, the terminal's presentation controller 122 receives control information from the server 102 (e.g., from the primary wagering game unit 114 or secondary wagering game unit 120). The flow continues at block 504.

At block 503, the control unit 136 determines priority for and stores the control information. Because the terminal 104 can present content for a plurality of wagering games, prioritizing the control information can impose an order in which each game's content will be presented. In some embodiments, the control unit 136 processes the highest priority control information first. Additional details about priority are described below.

At block 504, the presentation controller's control unit 136 processes the control information that has the highest priority. After selecting the control information having the highest priority, the presentation controller 122 parses the control information to determine what operations are specified in the control information. As part of processing the control information, the presentation controller 122 can configure terminal components to settings specified in the control information. The flow continues at block 506.

At block 506, if, based on the control information, there is content to present the flow continues at block 508. Otherwise, the flow continues at block 512.

At block 508, the presentation controller's graphics unit 132 and/or audio unit 134 fetches content specified in the control information. In some embodiments, the units 132 & 134 fetch audio and graphics content (e.g., MP3 files, JPEG files, MPEG files, etc.) from the content store 130. The units 132 & 134 also determine presentation parameters for the content. For example, the graphics unit 132 can determine a player interface area in which to present the content, a scale for the content, a time to present the content, etc. The audio unit 134 can determine on what devices to present content, when to present the content, etc. In some embodiments, some presentation parameters are based on priority.

In some embodiments, the control information specifies wagering game results without specifying content. Thus, the control unit 136 can select content for presenting the specified game result. In some embodiments, the control unit 136 can select content based on file names, metadata in the files, or any other suitable selection technique. The flow continues at block 510.

At block 510, the graphics and audio units 132 & 134 present the content based on the content parameters. For example, referring to FIG. 4, the graphics unit 132 can present graphics representing dealing cards, spinning reels, selected game pieces, etc. The content is presented in conformity with parameters such as size, interface location, etc. As noted above, priority information can affect the parameters. The flow continues at block 512.

At block 512, if there is no more control information to receive or process, the flow ends. Otherwise, the flow continues at block 514.

Figure 6:
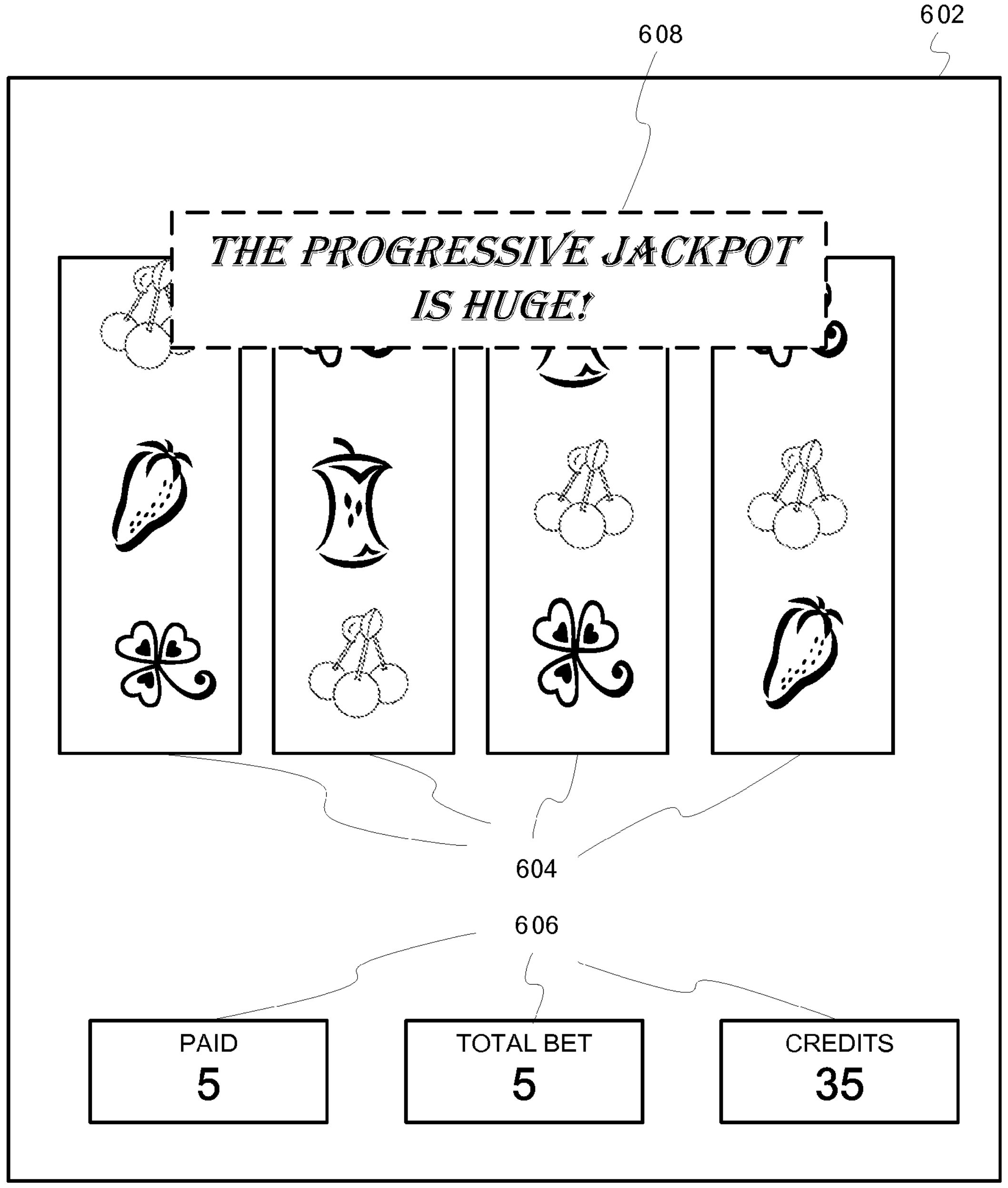
FIG. 6 illustrates a player interface in which content associated with a secondary game is superimposed over a primary game's content.

At block 514, if there is more control information to receive, the flow continues at In some embodiments, as part of presenting the content, the graphics unit 132 superimposes one game's content over another game's content. FIG. 6 helps describe this concept.

Figure 7:
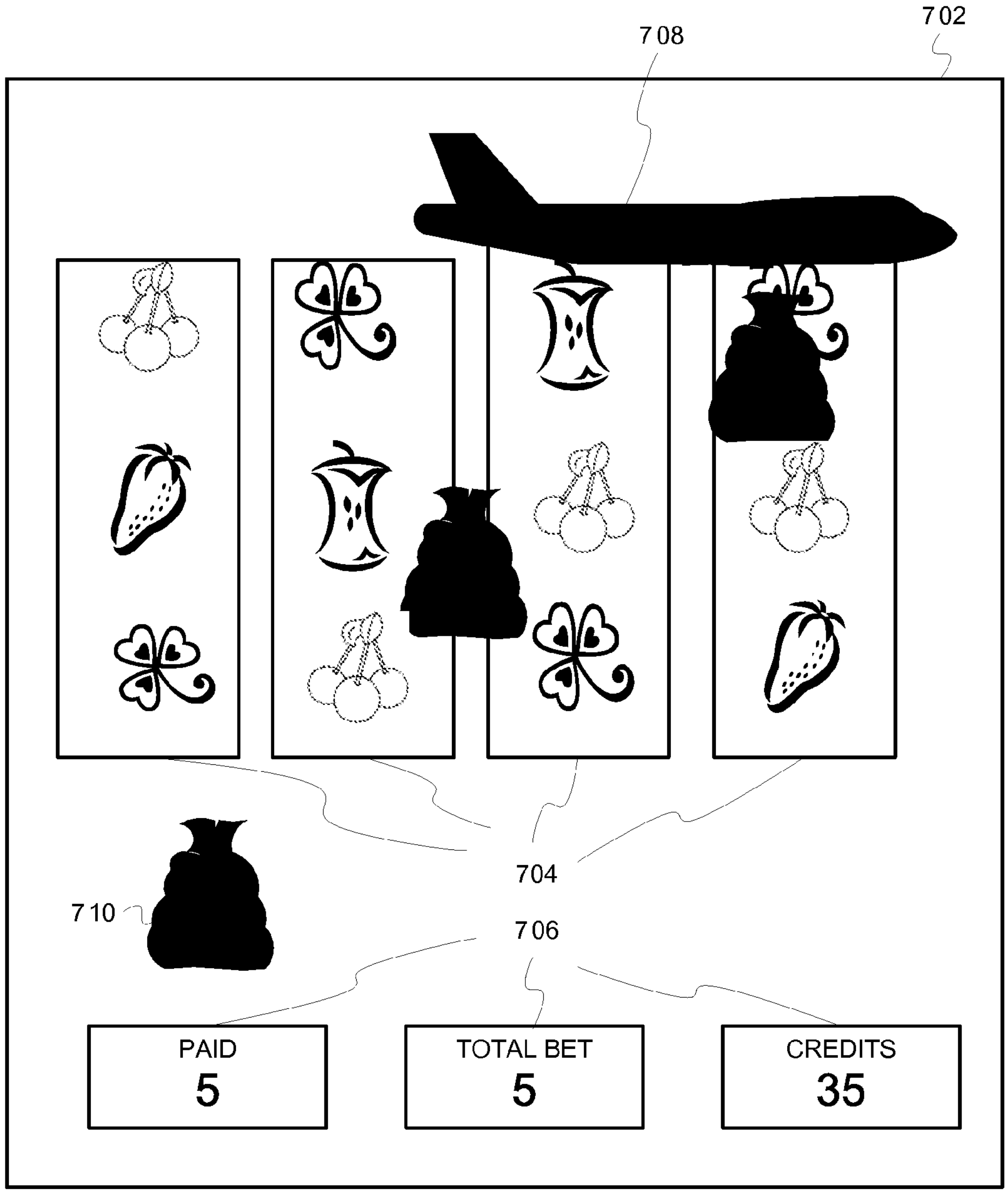
FIG. 7 illustrates a player interface in which game results associated with a secondary game are superimposed over a primary game's content.

FIG. 6 illustrates a player interface in which content associated with a secondary game is superimposed over a primary game's content. In FIG. 6, the player interface 602 includes video reels 604 and credit meters 606 associated with a primary slots game. However, the message 608 is associated with a secondary progressive game. For example, the presentation controller 122 can process control information originating from the secondary wagering game unit 120, which is conducting a secondary progressive game. The control information can request that the presentation controller 122 present the message 608 over the primary slots game's video reels 604. Because the terminal 104 allows for superimposed content, the secondary wagering game unit 120 can notify players about large jackpots or other events. For example, the secondary wagering game unit 120 can superimpose content to notify players about winning events. FIG. 7 shows an example of this.

FIG. 7 illustrates a player interface in which game results associated with a secondary game are superimposed over a primary game's content. In FIG. 7, the player interface 702 includes slots reels 704 and credit meters 706 associated with a primary slots game. However, the plane 708 and money bags 710 are associated with a secondary game. In some embodiments, after the secondary wagering game unit 120 determines a winner for a secondary game, it notifies the winner by superimposing the plane 708 and money bags 710 over the primary game content (i.e., the slots reels 704). To do this, the secondary wagering game unit 120 can transmit control information to the terminal 104, where the control information requests that content be presented in player interface areas assigned to other games. The terminal 104 can process the control information and present the content as described above.

Non-Gaming Content

As noted above, terminals can present content that is not directly related to wagering games. For example, terminals can present non-gaming content, such as player messages, hospitality information, news headlines, advertisements, messages from an online community, etc. The terminal can receive control information identifying non-gaming content. In some embodiments, the terminal can scale down and rearrange in-process games (i.e., already occurring games) to make room for non-gaming content. After the non-gaming content has been presented, the terminal can scale up the gaming content (see discussion of FIG. 2). In some embodiments, the terminal can also superimpose advertising content over wagering game content. The terminal's graphics unit can include logic that times presentation of superimposed non-gaming content. For example, during a slots game, the terminal can delay superimposing non-gaming content until after the graphics unit presents spinning reels. After the reels stop spinning, the graphics unit can superimpose advertising content over the reels.

In some embodiments, the terminal can present non-gaming content that is identified in the control information and stored in content store. The terminal can also present non-gaming content that is streaming and non-gaming content stored outside the terminal.

Additional Embodiments

As noted above, the wagering game terminals can be smart client devices. In some embodiments, the wagering game terminals can include logic for operating in concert with wagering game servers and/or working in a standalone mode (e.g., game results are determined on the terminal). The discussion of FIG. 8 additional embodiments of the wagering game terminal.

Wagering Game Terminals and Networks

Figure 8:
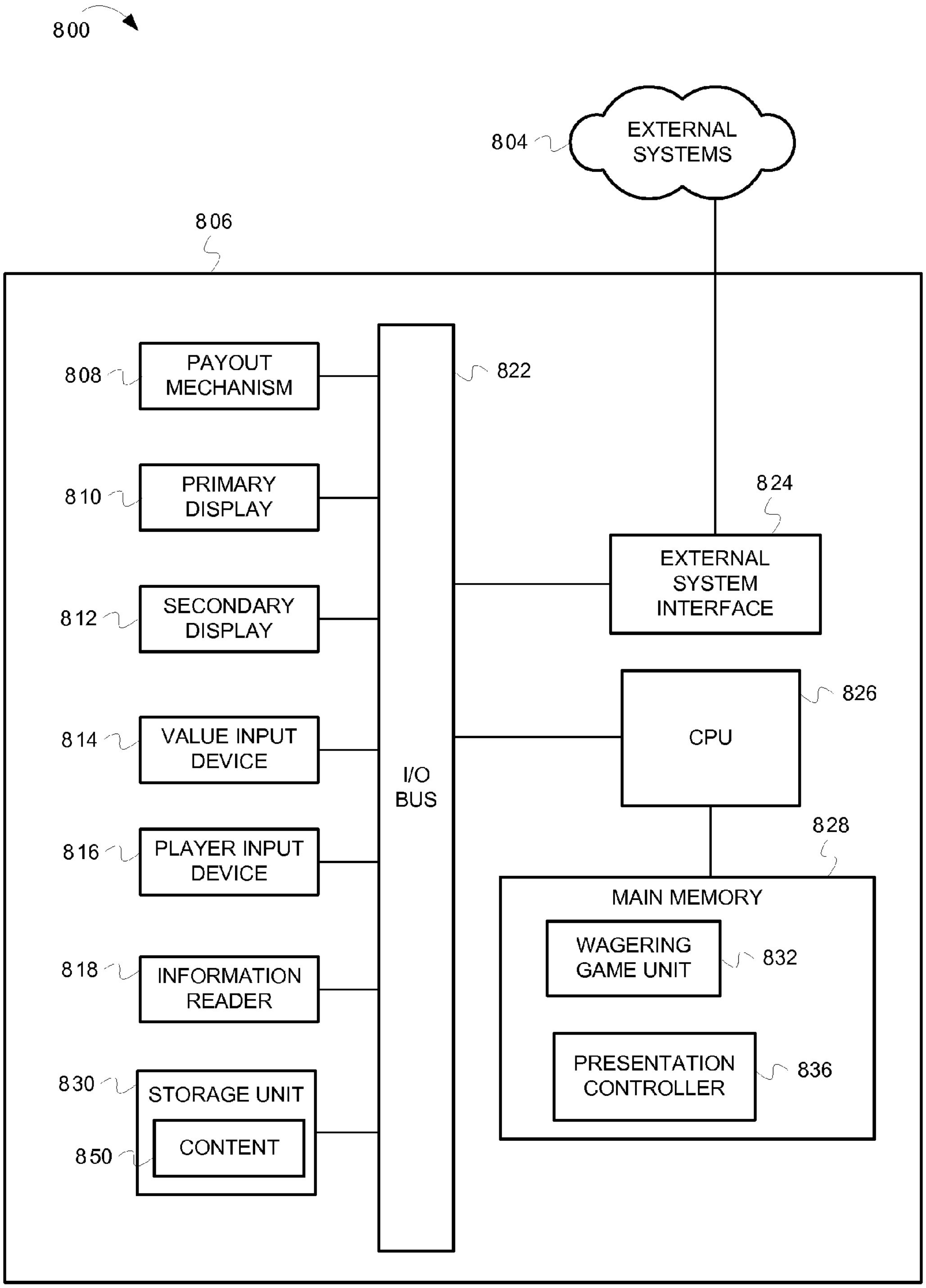
FIG. 8 is a block diagram illustrating a wagering game terminal, according to example embodiments of the invention.

FIG. 8 is a block diagram illustrating a wagering game terminal, according to example embodiments of the invention. As shown in FIG. 8, the wagering game terminal 806 includes a central processing unit (CPU) 826 connected to main memory 828. The CPU 826 can include any suitable processor, such as an Intel® Pentium processor, Intel® Core 2 Duo processor, AMD Opteron™ processor, or UltraSPARC processor. The main memory 828 includes a wagering game unit 832 and presentation controller 836. The wagering game unit 832 can determine results for wagering games, such as video poker, video black jack, video slots, video lottery, etc. In some embodiments, the wagering game unit 832 includes primary and secondary wagering game units that transmit control information to the presentation controller 836. In some embodiments, the presentation controller 836 receives the control information and presents, based on the control information, content on the display/audio devices.

The CPU 826 is also connected to an input/output (I/O) bus 822, which can include any suitable bus technologies, such as an AGTL+frontside bus and a PCI backside bus. The I/O bus 822 is connected to a payout mechanism 808, primary display 810, secondary display 812, value input device 814, player input device 816, information reader 818, and storage unit 830. The player input device 816 can include the value input device 814 to the extent the player input device 816 is used to place wagers. The I/O bus 822 is also connected to an external system interface 824, which is connected to external systems 804 (e.g., wagering game networks).

In one embodiment, the wagering game terminal 806 can include additional peripheral devices and/or more than one of each component shown in FIG. 8. For example, in one embodiment, the wagering game terminal 806 can include multiple external system interfaces 824 and/or multiple CPUs 826. In one embodiment, any of the components can be integrated or subdivided.

Any component of the wagering game terminal 806 (and any component described herein) can include hardware, firmware, and/or machine-readable media including instructions for performing the operations described herein. Machine-readable media includes any mechanism that provides (i.e., stores and/or transmits) information in a form readable by a machine (e.g., a wagering game terminal, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

While FIG. 8 describes wagering game terminals, the discussion continues with embodiments of a wagering game network.

Figure 9:
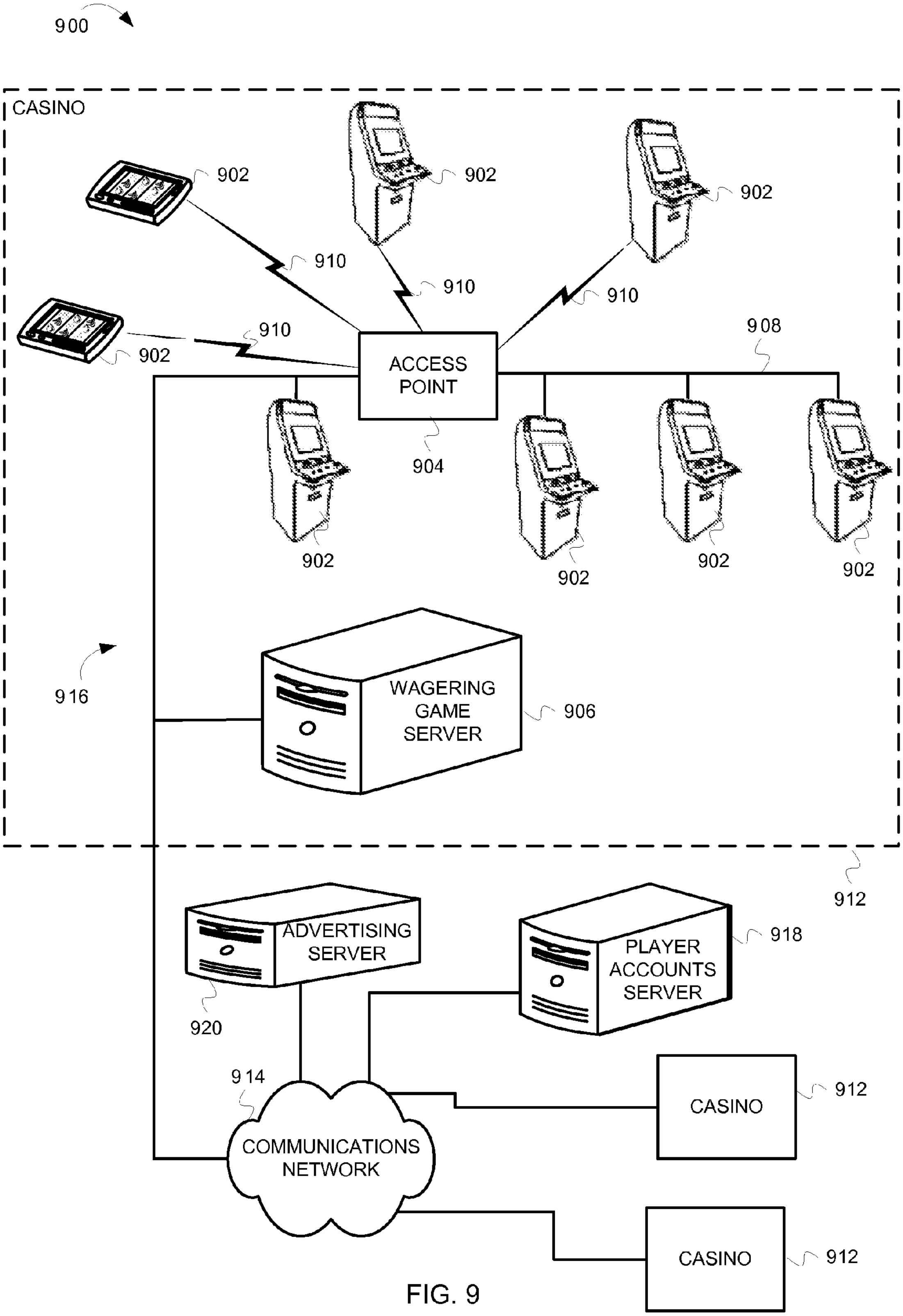
FIG. 9 is a block diagram illustrating a wagering game network, according to example embodiments of the invention.

FIG. 9 is a block diagram illustrating a wagering game network, according to example embodiments of the invention. As shown in FIG. 9, the wagering game network 900 includes a communications network 914 connected to a plurality of casinos 912. Each casino 912 includes a local area network 916, which includes an access point 904, a wagering game server 906, and wagering game terminals 902. The access point 904 provides wireless communication links 910 and wired communication links 908. The wired and wireless communication links can employ any suitable connection technology, such as Bluetooth, 802.11g, Ethernet, public switched telephone networks, SONET, etc. In some embodiments, the wagering game server 906 can host wagering games and distribute content to devices located in the casinos 912 or at other locations on the wagering game network 900.

The wagering game terminals 902 described herein can take any suitable form, such as floor standing models, handheld mobile units, bartop models, workstation-type console models, etc. Further, the wagering game terminals 902 can be primarily dedicated for use in conducting wagering games, or can include non-dedicated devices, such as mobile phones, personal digital assistants, personal computers, etc.

In some embodiments, wagering game terminals 902 and wagering game servers 906 work together as described above. In some embodiments, either the wagering game terminals 902 (client) or the wagering game server 906 can provide functionality that is not directly related to game play. For example, account transactions and account rules may be managed centrally (e.g., by the wagering game server 906) or locally (e.g., by the wagering game terminal 902). Other functionality not directly related to game play may include power management, presentation of advertising, software or firmware updates, system quality or security checks, etc. Any of the wagering game network components (e.g., the wagering game terminals 902) can include hardware and machine-readable media including instructions for performing the operations described herein.

The communications network 914 is also connected to a player account server 918 and an advertising server 920. The player account server 918 can facilitate cashless gaming by maintaining player financial accounts and processing financial transactions. For example, the player account server 918 can receive player account requests from the wagering game server (i.e., its accounting routing service). In response, the player account server 918 can credit and debit player accounts (e.g., based on game results).

The advertising server 920 can transmit control information to the wagering game terminals 902. The control information can request that the terminals 902 present advertising content. The wagering game network 900 can also include other network devices (not shown), such as player messaging servers, hospitality servers, wide area progressive servers, wagering game maintenance servers, etc.

In some embodiments, any component of the wagering game network 900 can include one or more solid state storage drives. Instead of storing data on pinning magnetic media, the solid state storage drives can store data in flash memory, magnetoresistive random access memory, phase-change memory, battery-backed dynamic random access memory, or any suitable nonvolatile semiconductor memory. As such, components of the wagering game network 900 can include solid state storage devices, such as an E-Disk® available from BitMicro®, an IDE Solid State Flash Drive from Memtech SSD Corporation, etc.

Any device in the wagering game network 900 can include biometric devices for authenticating players, casino operators, and other personnel. In some embodiments, the biometric devices can authenticate personnel by scanning and matching vein patterns (e.g., finger vein patters, palm vein patterns, etc.). The biometric devices can use near-infrared rays or other suitable techniques to scan vein patterns. For example, the biometric devices can generate near-infrared rays generated from a bank of LEDs (light emitting diodes) that penetrate a user's finger and are absorbed by hemoglobin in the user's blood. The areas in which the rays are absorbed (i.e. veins) appear as dark areas. The biometric device's image processing can then construct a finger-vein pattern from the image. The biometric device can then compress and digitize the pattern. This image can be recorded as registered template of the user's biometric authentication data. Later the biometric devices can use pattern-matching techniques to compare scanned images to registered images. To protect privacy, the biometric information can be stored in user cards (e.g., smart cards, magnetic cards, etc). The system can compare a scan of the user's veins (e.g., palm, finger, etc.) to a pre-registered scan stored on the user's card. Some embodiments can include contactless palm vein scanners from Fujitsu, finger vein scanners from Hitachi, or any other suitable vein scanners. In some embodiments, the biometric devices can be installed wagering game terminals.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which is defined only by the appended claims. Each of the embodiments described herein are contemplated as falling within the inventive subject matter, which is set forth in the following claims.

The invention claimed is:

1. A method comprising:

configuring a wagering game terminal for contemporaneously presenting a plurality of primary wagering games, the configuring including, dividing a player interface into a plurality of areas, wherein each of the areas is associated with one of the primary wagering games;

resizing content for the primary wagering games to fit in the areas; and creating separate credit meters for each of the primary wagering games;

receiving, from at least one remote wagering game server, results for one or more of the primary wagering games and information about a secondary wagering game;

determining a priority for each of the results and the information, wherein at least one of the results has lower priority than the information;

updating one or more of the credit meters based on the results for the one or more of the primary games;

displaying, in order of the priority, the results in the one or more areas of the player interface; and superimposing the information over the at least one of the game results that has lower priority than the information.

2. The method of claim 1 further comprising:

receiving a request to present non-gaming content in the player interface, wherein the non-gaming content is stored on the wagering game terminal; and presenting the non-gaming content in the player interface.

3. The method of claim 2, wherein the non-gaming content includes one or more selected from advertising content, player messaging content, hospitality content, and attract mode content.

4. The method of claim 2 further comprising:

subdividing the player interface to include another area;

resizing the non-gaming content to fit in the other area, wherein the presenting displays the non-gaming content in the other area.

5. The method of claim 1, wherein the content resides on the wagering game terminal before the results are received.

6. The method of claim 1, wherein the areas are different sizes.

7. A wagering game terminal comprising:

a content store including wagering game content associated with a plurality of primary and secondary wagering games, wherein the secondary wagering games are not triggered by events in the primary wagering games, and wherein the secondary wagering games are funded independently of the primary wagering games; and a presentation controller including, a control unit configured to receive control data including results for the plurality of primary wagering games, and information indicating separate credit meter balances for each of the plurality of primary wagering games, receive information about a secondary wagering game;

determine a priority for each of the results and the information about the secondary wagering game, wherein one of the results has a lower priority than the information about the secondary wagering game;

a graphics unit configured to display, in order of the priority for each of the results, the results in separate areas of a player interface, wherein each of the separate areas corresponds with a different one of the plurality of primary wagering games;

present the separate credit meter balances for each of the plurality of primary wagering games;

superimpose the information about the secondary wagering game over the one of the results that has a lower priority than the information about the secondary wagering game; and an audio unit configured to process and present, via an audio presentation device, sounds included in the wagering game content.

8. The wagering game terminal of claim 7, wherein the content store also includes non-gaming content, and wherein the control data further includes a request to present the non-gaming content, and wherein the graphics unit is further configured to present the non-gaming content in the player interface.

9. The wagering game terminal of claim 8, wherein the non-gaming content includes advertising content, player messaging content, hospitality content, and attract mode content.

10. The wagering game terminal of claim 7, wherein the content store also includes non-gaming content, and wherein the control data further includes a request to present the non-gaming content, and wherein the graphics unit is further configured to superimpose the non-gaming content over one or more of the game elements.

11. The wagering game terminal of claim 7, wherein the game content include one or more selected from slot reel symbols, playing cards, and keno game pieces.

12. The wagering game terminal of claim 7 further comprising:

an input device configured to receive player input, wherein the wagering game terminal is configured to forward the player input to a wagering game server.

13. The wagering game terminal of claim 7, wherein the control data originates at a remote wagering game server.

14. A tangible machine-readable storage device including code executable by a wagering game terminal, the code comprising:

code to detect initiation of a plurality of primary wagering games;

code to collect wagers on secondary wagering games, wherein the secondary wagering games are triggered by events independent of the primary wagering games, and wherein the wagers are independent of the plurality of primary wagering games;

code to divide a player interface into a plurality of areas, wherein each of the areas corresponds to one of the primary wagering games;

code to shrink game elements to fit in the areas, wherein the game elements are associated with the primary and secondary wagering games;

code to receive, from at least one remote wagering game network device, results for the primary wagering games and information about one of the secondary wagering games;

code to assign a priority to each of the results and the information, wherein the assignment of the priority causes at least one of the results to have lower priority than the information;

code to display, in at least one of the areas, each of the results for the primary wagering games in order of the priority assigned to each of the results;

code to display, in at least one of the areas, a plurality of credit meters, where each of the credit meters indicates a credit balance for a different one of the primary wagering games;

code to superimpose, the information over one or more of the results that was assigned lower priority than the information.

15. The tangible machine-readable storage medium of claim 14, wherein the game elements include playing cards and slots reels.

16. The tangible machine-readable storage medium of claim 14 further comprising:

code to superimpose a message about one of the plurality of wagering games over one or more of the game elements of the first group.

17. The tangible machine-readable storage medium of claim 14, wherein the secondary wagering games do not depend on results of the primary wagering games.

18. The tangible machine-readable storage medium of claim 14 further comprising:

code to receive a request to present non-gaming content, wherein the non-gaming content is stored on the wagering game terminal; and code to superimpose non-gaming content over one or more of the game elements of the first and second groups.

19. The tangible machine-readable storage medium of claim 14, wherein the information about at least one of the secondary wagering games indicates a jackpot for one of the secondary wagering games for which a result has not been determined.

20. The tangible machine-readable storage medium of claim 14, wherein the information about at least one of the secondary wagering games indicates a result for one of the secondary wagering games.

* * * * *